Feb. 6, 1923.
L. P. HALLADAY.
BUMPER SUPPORT.
FILED FEB. 25, 1922.
1,444,184
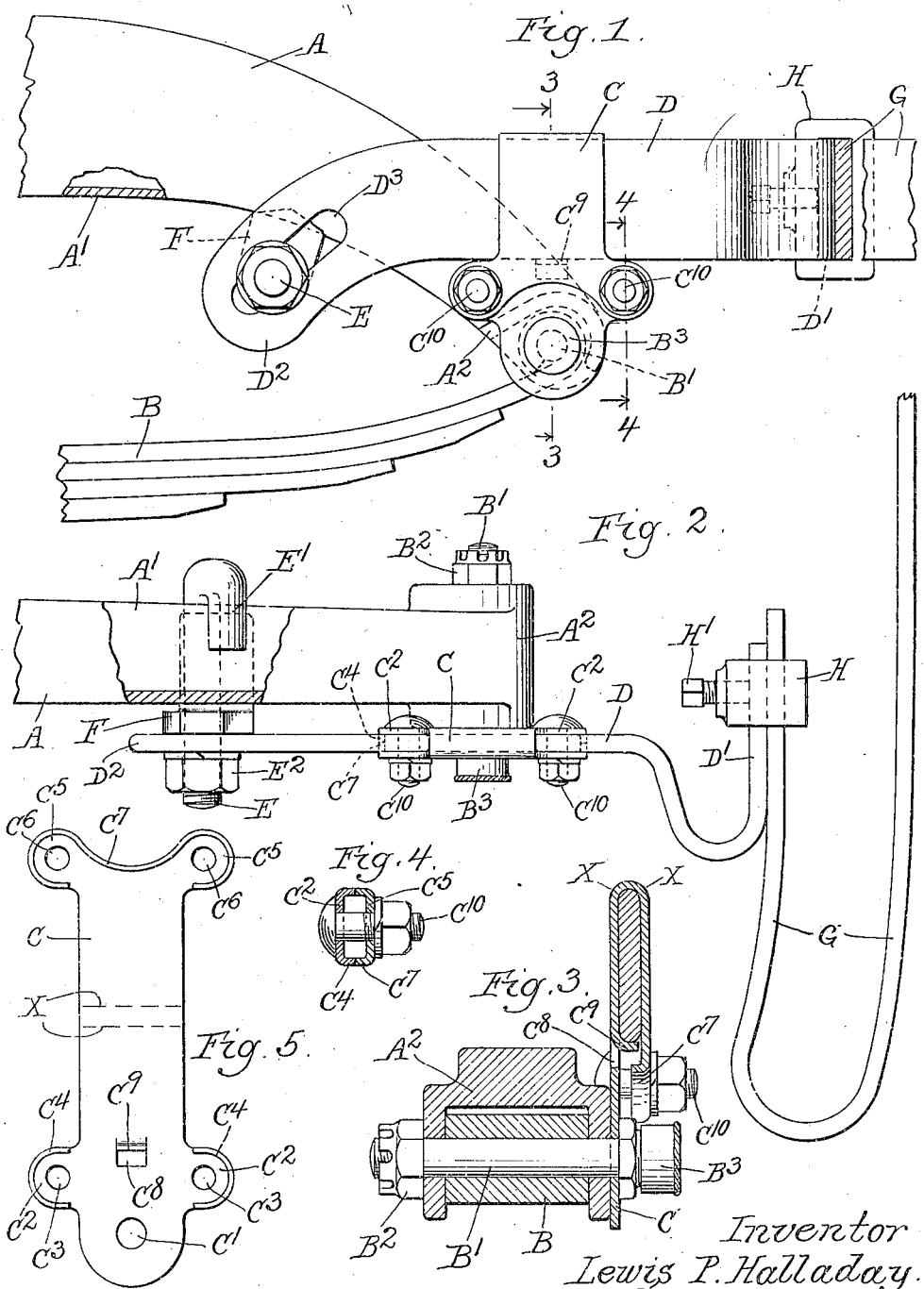
Witness.
Edward T. Wray
Inventor
Lewis P. Halladay.
by Parker + Carter
Attorneys.

Patented Feb. 6, 1923.

1,444,184

UNITED STATES PATENT OFFICE.

LEWIS P. HALLADAY, OF DECATUR, ILLINOIS.

BUMPER SUPPORT.

Application filed February 25, 1922. Serial No. 539,146.

*To all whom it may concern:*

Be it known that I, LEWIS P. HALLADAY, a citizen of the United States, residing at Decatur, in the county of Macon and State of Illinois, have invented a certain new and useful Improvement in Bumper Supports, of which the following is a specification.

This invention relates to a bumper support adapted to support an automobile bumper. It has for one object to provide in combination a hook attachment and a pivotal attachment which will carry the bumper support and in which the bumper support may be slidably mounted. Other objects will appear from time to time throughout the specification and claims. The pivotal support is intended to be carried by the forward spring bolt of the automobile frame and is intended to be pivotally mounted thereupon. The bumper supporting member is slidably mounted in this support so that it may be moved backward and forward in order to permit longitudinal adjustment of the position of the bumper. The rear end of the bumper support is fastened to the lower side of the channel frame of the chassis by means of a hook bolt which may be of any suitable design.

My invention is illustrated more or less diagrammatically in the accompanying drawings, wherein—

Figure 1 is a side elevation;

Figure 2 is a plan view of Figure 1 with parts broken away;

Figure 3 is a section taken on line 3—3 of Fig. 1;

Figure 4 is a section taken on line 4—4 of Fig. 1;

Figure 5 is a development of a part of the pivotal member.

Like parts are designated by like characters throughout.

A is the side channel member of an automobile frame having the lower web $A'$ which the hook bolt grips. B is a spring which is fastened to the fitting $A^2$ by means of the spring bolt $B'$ which may be provided at one end with the castellated nut $B^2$ and at the other with a lubricating device $B^3$, although these features may be omitted or modified.

C is the pivotal support formed as shown in Figures 1 and 3 in the shape of a loop. At its lower end it is provided with the perforation $C'$ which fits upon the spring bolt $B'$. On either side of the lower end of the member C adjacent the perforation $C'$ are the two laterally extending ears $C^2 C^2$ provided with perforations $C^3 C^3$. Surrounding these ears and extending at right angles from the faces of them are the flanges $C^4 C^4$.

At the other end of the member C are the two laterally extending ears $C^5 C^5$ having in each of them the perforations $C^6 C^6$. These ears and the end of the member C are surrounded by the outwardly extending flange $C^7$. As shown in Figures 1 and 3 the member C is bent roughly along the lines $x$—$x$ so that its two ends are brought into opposition and so that the perforations $C^3 C^3$ register with the perforations $C^6 C^6$, and so that the flanges $C^4 C^4$ contact the flange $C^7$; thus giving an added strengthening and supporting feature at the point of contact of the two ends of the member C. Toward its bottom the member C is provided with the perforation $C^8$ which is formed by punching inwardly a tongue $C^9$. The position of the perforation may be varied in accordance with the width of the bumper support bar by the workman who applies the fitting. For a smaller bar he merely punches the hole a little larger, and thus, of course, shortens the distance between the inwardly projecting tongue and the top of the loop. This tongue as shown in Figure 3 is adapted to contact the under side of the bumper supporting bar and thus to center and position it within the loop.

$C^{10} C^{10}$ are bolts which lie within the perforations $C^3$ and $C^6$ and clamp the two ends of the loop member C together. In Figure 4 there is shown a detail illustrating the use of such bolt and illustrating the co-operation of one of the flanges $C^4$ with the flange $C^7$.

D is the bumper supporting bar provided at its forward end with the laterally extended portion $D'$ which lies normally at right angles to the portion D. It is provided in its rear with the downwardly bent portion $D^2$ which has in it a slot $D^3$. Within this slot there is positioned a hook bolt E which is adjustable as to position and which engages the part $A'$ as at $E'$. Mounted upon the hook bolt E is a wedge block F which is given a wedging action by the tightening of the nut $E^2$ on the hook bolt E. By means of this hook bolt and the wedge upon it, the rear end of the member D may be secured rigidly to the automobile frame at any suitable point and a wide range of adjustment is provided.

G is a bumper bar which may be of any suitable type and shape but it is here shown as being provided with a flat section. This section as here shown corresponds in width and thickness to the part D' of the bar B. These two members are surrounded by a cleat H which holds them together. In the cleat H a set screw H' serves to tighten its hold.

Although I have shown an operative device, still it will be obvious that many changes in size, shape and arrangement of parts may be made without departing materially from the spirit of my invention, and I wish therefore that my showing be taken as in a sense diagrammatic.

The use and operation of my invention are as follows:

This bumper supporting arrangement has been made adjustable in a number of respects in order that it may be readily applied to a large variety of automobiles wherein the shape and arrangement of the forward end of the frame frequently differs greatly.

The pivotal loop or bracket is first mounted upon the end of a spring bolt and a bumper holding bar is fitted into it. The forward and back adjustment of the bumper is made by moving the bar forward or back through the loop a suitable distance. When this adjustment has been made the up and down adjustment of the bumper bar may readily be accomplished by rotating the brackets about the spring bolt, and sliding the hook bolt along the frame and the inclined slot in the end of the bar. When a suitable position has been arrived at, the hook bolts are tightened so as to grip the flange of the channel member of the frame or chassis rigidly, and the adjustment of the bumper is thus complete.

This type of bumper support is particularly efficient since it enables the bumper to be pivoted conveniently upon the spring bolt without subjecting the spring bolt to the shock of the bumper impact, which might otherwise tend to break off the end of the bolt. The bar is normally gripped sufficiently tightly by the pivotal loop to prevent play and of course the loop secures the bar against any lateral movement. Resistance against longitudinal movement of the bar is provided by the hook bolt which clamps upon the automobile frame. Any shock strong enough to damage the spring bolt is transmitted not to the spring bolt but to the hook bolt at the rear and thus to the frame flange.

I claim:

1. The combination with an automobile, of a bumper carried thereby, a supporting bar projecting rearwardly from the bumper, a yoke pivoted on the automobile spring pin, the supporting bar being slidable in said yoke, means for locking the bar in position with respect to the yoke, and a clamp adapted to be locked adjustably in position on the automobile frame, a pin projecting therefrom, the end of the bar being pivoted with an inclined slot engaging said pin, and means for locking the pin in position in said slot to adjustably position the bumper.

2. A bumper support comprising a rearwardly projecting supporting bar, a forward supporting member pivoted to the automobile frame and in slidable engagement with said bar, and a rear clamping member adapted positively to secure the inner end of the bar to the automobile frame.

3. A bumper support comprising a rearwardly projecting supporting bar, a forward supporting member pivoted to the automobile frame and in slidable engagement with said bar, and a rear clamping member adapted positively to secure the inner end of the bar to the automobile frame and adapted to be adjusted along the frame to permit vertical adjustment of the bumper.

4. A bumper support comprising a rearwardly projecting supporting bar, a support therefor pivoted adjacent the forward spring bolt, and an additional support adapted positively to secure the inner end of the bar to the automobile frame, the inner end of the bar being downwardly turned and provided with an inclined slot, the rear clamping member being adjustable along the automobile frame and in relation to said inclined slot.

5. A bumper support comprising a rearwardly projecting supporting bar, a forward supporting member pivoted to the automobile frame and in slidable engagement with said bar, and a rear clamping member adapted positively to secure the inner end of the bar to the automobile frame, the inner end of the bar being downwardly turned and provided with an inclined slot, the rear clamping member being adjustable along the automobile frame and in relation to said inclined slot.

6. A bumper support comprising a rearwardly projecting supporting bar, a forward supporting member pivoted to the automobile frame and in slidable engagement with said bar, and a rear clamping member adapted positively to secure the inner end of the bar to the automobile frame, the forward supporting member comprising a spring clip pivoted upon the forward spring bolt, and means for tightening said clip to prevent movement of said bar therethrough.

7. A bumper support comprising a rearwardly projecting supporting bar, a forward supporting member pivoted to the automobile spring bolt and in slidable engagement with said bar, and a rear clamping member adapted positively to secure the inner end of the bar to the automobile frame.

8. A bumper support comprising a rearwardly projecting supporting bar, a rear clamping member adapted positively to secure the inner end of the bar to the automobile frame, a forward supporting member pivoted to the automobile spring bolt and in slidable engagement with said bar, and means for so tightening said forward supporting member about said bar as to hold them normally in constant relation, while permitting the major shocks to be transmitted along the bar and directly to the rear clamping member.

9. A bumper support comprising a rearwardly projecting supporting bar, a rear clamping member adapted positively to secure the inner end of the bar to the automobile frame, a forward supporting member pivoted upon the automobile spring bolt and in slidable engagement with said bar, said supporting member being adapted to grip said bar sufficiently tightly to hold it normally against longitudinal movement, said rear clamping member being adapted to hold said bar against longitudinal shocks sufficiently strong to move it in relation to the forward supporting member.

10. A bumper support comprising a rearwardly projecting supporting bar, a rear clamping member adapted positively to secure the inner end of the bar to the automobile frame, a forward supporting member pivoted to the automobile spring bolt and in slidable engagement with said bar, the engagement between the forward supporting member and the bar being such that the major shocks along the bar are transmitted not to the spring bolt but to the rear clamping member.

Signed at Chicago, County of Cook and State of Illinois, this 21st day of February 1922.

LEWIS P. HALLADAY.